United States Patent
Makihata

(10) Patent No.: US 6,278,770 B1
(45) Date of Patent: Aug. 21, 2001

(54) VOICE INFORMATION SERVICE SYSTEM AND AN OPERATION METHOD APPLIED THEREIN

(75) Inventor: Kazuhisa Makihata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/065,424

(22) Filed: Apr. 24, 1998

(30) Foreign Application Priority Data

Apr. 25, 1997 (JP) .................................................. 9-108704

(51) Int. Cl.⁷ ........................................................ H04M 1/64
(52) U.S. Cl. ............................ 379/76; 379/67.1; 379/77; 379/88.24
(58) Field of Search .................................. 379/386, 93.18, 379/261, 93.26, 88.04, 88.18, 88.21, 93.23, 130, 101.01, 93.12, 203, 204, 233, 917, 88.23, 88.24, 67.1, 76, 77, 88.25

(56) References Cited

U.S. PATENT DOCUMENTS

| | | | |
|---|---|---|---|
| 4,899,369 | 2/1990 | Kondziela | 379/101 |
| 5,056,086 | * 10/1991 | Libonati | 379/88 |
| 5,163,084 | * 11/1992 | Kim et al. | 379/88.01 |
| 5,530,950 | * 6/1996 | Medan et al. | 379/88.24 |
| 5,751,790 | * 5/1998 | Makihata | 379/88 |

FOREIGN PATENT DOCUMENTS 63-90357   6/1988 (JP) .
1-294527  11/1989 (JP) ................................ H04M/3/50

OTHER PUBLICATIONS

ISBN 0–936648–60–0, Newton, Harry, Newton's Telecom Dictionary, 8th edition, Flatiron Publishing, Inc., Printed at Bookcrafters, Chelsea, MI, USA, copyright 1994, p. 935.*

PN 101–1327–001 Version 2, Octel User Reference Manual for voice information processing, Octel Communications Corp., 1001 Murphy Ranch Road, Milpitas, CA, USA 95035–7912, copyright 1994.*

* cited by examiner

Primary Examiner—Fan Tsang
Assistant Examiner—Ovidio Escalante
(74) Attorney, Agent, or Firm—Foley & Lardner

(57) ABSTRACT

To provide a voice information service system wherein designation of the desired item of the voice information can be easily performed even with a cordless telephone by manipulating one or two specific telephone keys, the voice information service system comprises; a DTMF input timing detector (4) for detecting input timing of a specific DTMF (Dual Tone Multi-Frequency) code entered by the user, and calculating an effective passage time necessary for reproducing the voice information from a head until the specific DTMF code is entered, and an information number setting section (3) for determining an alternative information number of voice information to be reproduced next, according to the effective passage time, information number of the voice information actually served and a kind of the specific DTMF code.

2 Claims, 3 Drawing Sheets

| INFORMATION NUMBER | BEGINNING TIME | ENDING TIME | NEXT INFORMATION NUMBER |
|---|---|---|---|
| 1 0 0 | 0.0 | 6.1 | -1 |
| | 6.2 | 17.5 | 1 5 0 |
| | 17.6 | 25.5 | 1 5 1 |
| | 25.6 | 30.3 | 1 5 2 |
| 1 1 0 | 0.0 | 5.5 | -1 |
| | 5.6 | 9.2 | 1 6 0 |
| | 9.3 | 14.8 | 1 6 1 |
| 1 5 0 | 0.0 | 6.0 | -1 |
| | 6.1 | 12.4 | 2 5 0 |
| | 12.5 | 12.6 | 2 5 1 |
| 2 5 0 | 0.0 | 25.4 | 1 0 0 |

| INFORMATION NUMBER | BEGINNING TIME | ENDING TIME | NEXT INFORMATION NUMBER | CONTENT |
|---|---|---|---|---|
| 1 0 0 | 0.0 | 6.1 | -1 | "Thank you for your calling for our service. Please push your asterisk key when you hear interesting guidance. When you wish to pass uninteresting guidance, please push your sharp key." |
| | 6.2 | 17.5 | 1 5 0 | "As to the product A, push now your asterisk key." |
| | 17.6 | 25.5 | 1 5 1 | "As to the product B, push now your asterisk key." |

FIG.3

| INFORMATION NUMBER | BEGINNING TIME | ENDING TIME | NEXT INFORMATION NUMBER |
|---|---|---|---|
| 100 | 0.0 | 6.1 | -1 |
|  | 6.2 | 17.5 | 150 |
|  | 17.6 | 25.5 | 151 |
|  | 25.6 | 30.3 | 152 |
| 110 | 0.0 | 5.5 | -1 |
|  | 5.6 | 9.2 | 160 |
|  | 9.3 | 14.8 | 161 |
| 150 | 0.0 | 6.0 | -1 |
|  | 6.1 | 12.4 | 250 |
|  | 12.5 | 12.6 | 251 |
| 250 | 0.0 | 25.4 | 100 |

FIG.4

| INFORMATION NUMBER | BEGINNING TIME | ENDING TIME | NEXT INFORMATION NUMBER | CONTENT |
|---|---|---|---|---|
| 100 | 0.0 | 6.1 | -1 | "Thank you for your calling for our service. Please push your asterisk key when you hear interesting guidance. When you wish to pass uninteresting guidance, please push your sharp key." |
|  | 6.2 | 17.5 | 150 | "As to the product A, push now your asterisk key." |
|  | 17.6 | 25.5 | 151 | "As to the product B, push now your asterisk key." |

VOICE INFORMATION SERVICE SYSTEM AND AN OPERATION METHOD APPLIED THEREIN

BACKGROUND OF THE INVENTION the present invention relates to a voice information service system wherein voice information recorded in the system is reproduced to be served to a user through a telephone network according to selection of the user, and particularly relates to an operation method for selecting an item of the voice information to be served.

In conventional voice information service systems, a different information number is assigned to each item of voice information prepared in the systems, so that a user can designate a desired information number by way of a DTMF (dual Tone Multi-Frequency) code by pushing numeral keys of a telephone, directly or according to a guidance, for obtaining necessary information.

As a prior art of application of the DTMF code, there is a communication system disclosed in a Japanese utility model application laid open as a provisional Publication No. 90357/88. In this prior art, one of various functions of the communication system, which is provided with telephone keys, is selected by pushing a sequence of the telephone keys including an asterisk key, sharp key and ten keys.

However, both in the conventional voice information systems and in the above prior art, the user's designation is discriminated only with the DTMF code itself, that is, only according to kinds and order of telephone keys manipulated by the user.

Therefore, for entering a desired DTMD code, it is necessary for the user to push an intending key or keys in correct order by selecting them among the telephone keys. this is inconvenient for a cordless telephone such as a mobile phone which is in widespread use.

In order to enter a DTMF code by way of the cordless telephone, wherein the telephone keys are unitized in a handset, the user is forced to put the handset away from his ear for selecting the intended keys to be pushed, and again to put the handset to his ear for receiving the voice information. Furthermore, this "off-ear" handset manipulation may be forced several times, especially when the necessary voice information is to be selected by entering the DTMF codes in accordance with a guidance, resulting in mis-receiving of the voice information.

SUMMARY OF THE INVENTION

Therefore, a primary object. of the present invention is to provide a voice information service system wherein designation of the desired item of the voice information can be easily performed even with a cordless telephone, and an operation method to be applied therein.

In order to achieve the object, a voice information service system of the invention comprises:

a communication control section for controlling call processing and voice communication procedure;

a voice information control section for controlling registration and reproduction of the voice information;

a DTMF input timing detector for detecting input timing of one of specific DTMF codes entered by the user during the voice information of a first information number that is being served to the user, and calculating an effective passage time which is necessary for reproducing the voice information of the first information number from a start of a message until a specific DTMF code is entered;

an information number setting section for determining a second information number of the voice information to be reproduced instead of the voice information of the first information number together with a beginning point wherefrom the voice information of the second information number is to be reproduced for the user, according to the effective passage time of the voice information, the first information number and a specific DTMF code entered by the user; and a voice information storing section for storing the voice information.

Therefore, the user can operate the voice information service system of the invention without putting his handset away from his ear even with a cordless telephone, since it can be manipulated by pushing only predetermined specific telephone keys such as the asterisk key and the sharp key.

BRIEF DESCRIPTION OF THE DRAWINGS

The foregoing, further objects, feature, and advantages of this invention will become apparent from a consideration of the following description, the appended claims, and the accompanying drawings wherein the same numerals indicate the same or the corresponding parts.

In the drawings:

FIG. 3 illustrates an example of a next information number table prepared in the information number setting section 3 off FIG. 1; and FIG. 4 shows some examples of contents of the voice information prepared in the voice information storing section 5 of FIG 1, wherein the contents of the voice information are listed in connection with the next information number table of FIG. 3.

DETAILED DESCRIPTION OF THE PREFERRED EMBODIMENTS

Now, embodiments of the present invention will be described in connection with the drawings.

Figure 1:
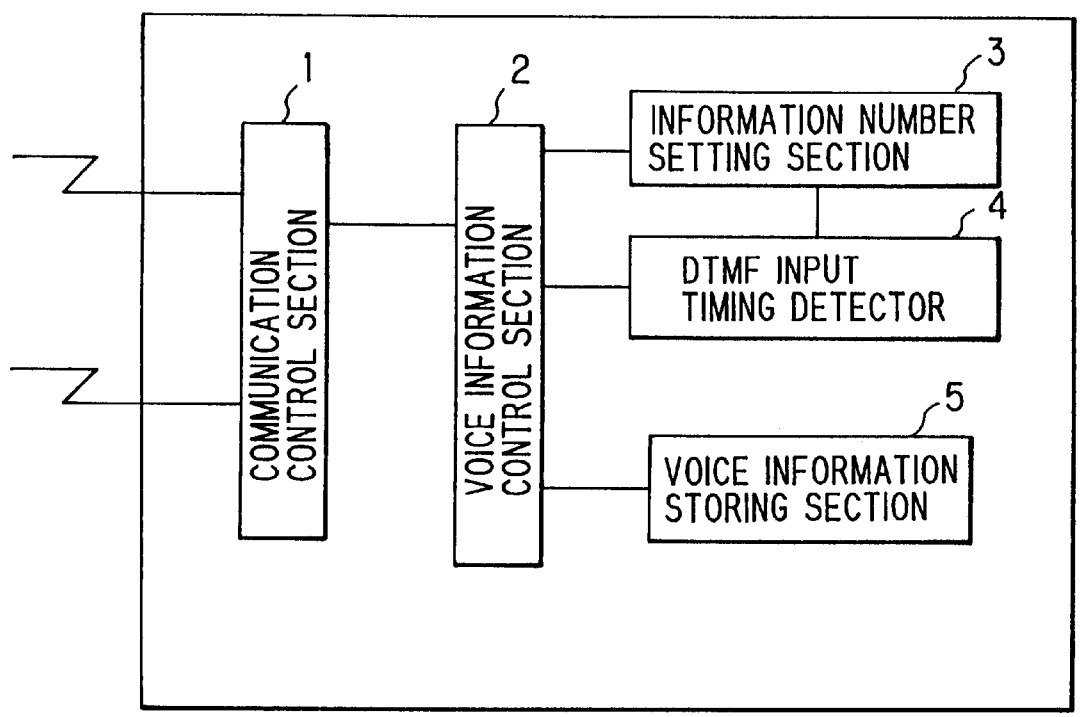
FIG. 1 is a block diagram illustrating a voice information service system according to an embodiment of the invention.

FIG. 1 is a block diagram illustrating a voice information service system according to an embodiment of the invention.

Referring to FIG. 1, the voice information service system comprises;

a communication control section 1 for controlling call processing and voice communication procedure;

a voice information control section 2 for controlling registration and reproduction of voice information;

a DTMF input timing detector 4 for detecting input timing of a specific DTMF code entered by a user during voice information of a information number that is being served to the user;

an information number setting section 3 for determining a next information number of the voice information to be reproduced instead of the voice information actually served for the user according to time interval between beginning of reproduction of the voice information actually served and the input timing of the specific DTMF code detected by the DTMF input timing detector 4, and a voice information storing section 5 for storing voice information to be served.

Figure 2A:
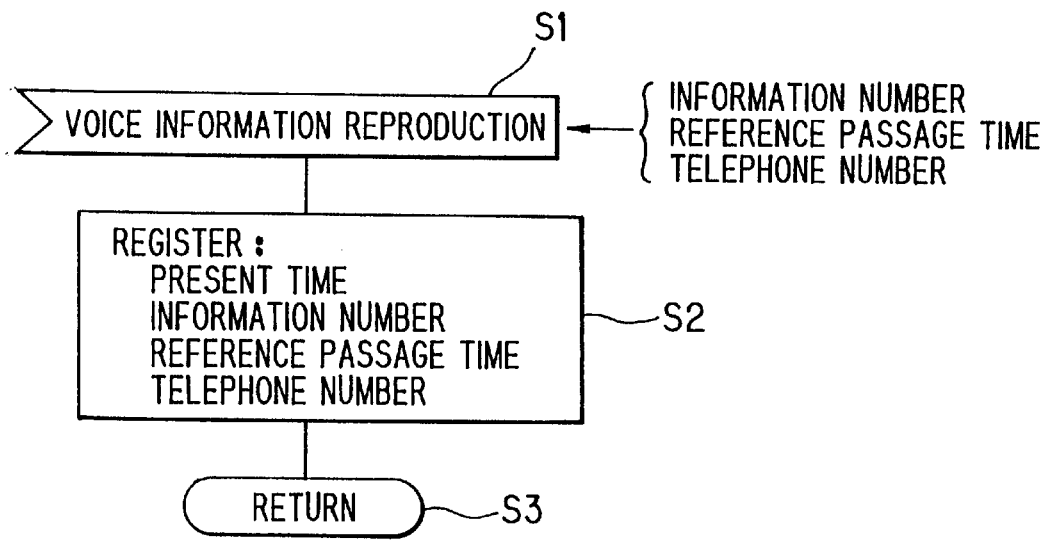
FIG. 2A is a flowcharts illustrating interruption procedure performed in the DTMF input timing detector 4 of FIG. 1, when voice information of an information number begins to be reproduced.
Figure 2B:
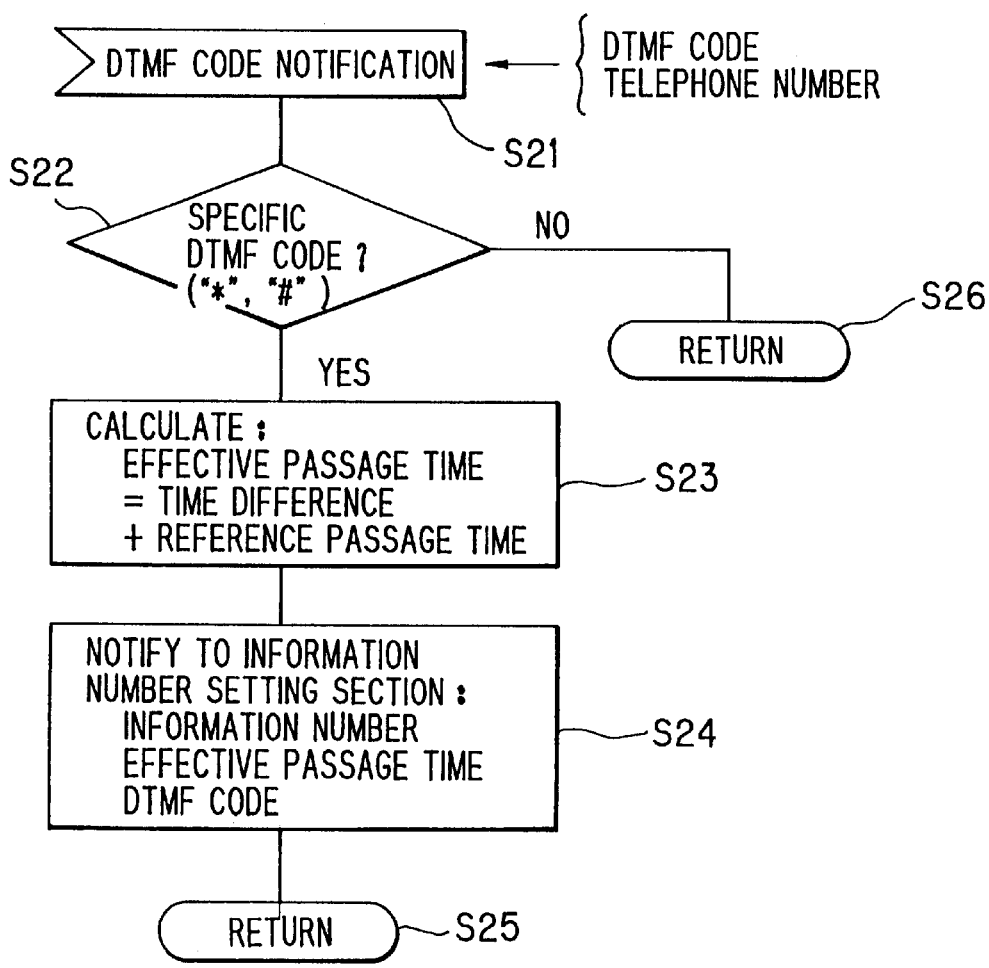
FIG. 2B is a flowchart illustrating interruption procedure performed in the DTMF input timing detector 4, when a user receiving voice information enters a DTMF code.

FIG. 2A and FIG. 2B are flowcharts illustrating interruption procedures performed in the DTMF input timing detector 4. The interruption procedure of FIG. 2A is performed when voice information of an information number begins to be reproduced.

Referring to FIG. 2A, when new voice information begins to be reproduced, the information number of the voice information, a telephone number of a user where the voice information is served and a reference passage time are notified to the DTMF input timing detector 4 from the voice information control section 2 (at step S1) The reference passage time indicates a virtual passage time with respect to a point in time at which point the voice information begins to be provided to the user. The DTMF input timing detector 4 measures a present times with respect to a difference from a most-recent interruption (e.g. DTMF input by the user), and registers the present time associated with the information number, the telephone number, and the reference passage time (at step S2). Then, the DTMF input timing detector 4 waits for a next interruption (at step S3).

When a user who is receiving voice information enters a DTMF code, the interruption procedure of FIG. 2B is performed.

Referring to FIG. 2B, when a DTMF code is entered by a user receiving voice information, the DTMF code is notified to the DTMF input timing detector 4 through the voice information control section 2 together with the telephone number of the user (at step S21). When the DTMF code is found (at step S22) to be one of predetermined specific DTMF codes, ail asterisk '*' and a sharp '#', for example, the DTMF input timing detector 4 measures a present time at which the DTMF code was entered by the user in order to determine an effective passage time (at step S23). The as effective passage time indicates a necessary reproduction time if the voice information is reproduced from the start of the voice information until the DTMF code is entered, by adding a time difference between the reproduction entry time previously registered and the DTMF code notification onto a reference-passage time associated with the previously registered reproduction notification. The effective passage Ale thus calculated is notified to the information number setting section 3 together with the information number actually under reproduction and the, DTMF code (at step S24), and the interruption procedure ends (at step S25).

When the DTMF code is found to be other than the predetermined specific codes at step S22, the interruption procedure ends (at step S26) ignoring the DTMF code.

The information number setting section 3 determines a next information number of the voice information to be served for the user referring to a next information number table prepared in the information number setting section 3, according to the effective passage time, the information number of the voice information actually under reproduction and the DTMF code notified from the DTMF input timing detector 4.

FIG. 3 illustrates an example of the next information number table, wherein a beginning time, an ending time and a next information number of the voice information to be reproduced alternatively are registered for each piece of the voice information sorted according to the information number and the beginning time of the piece.

For example, when notification data comprising an information number of '100', an effective passage time of '8 sec.' and a DTMF code of '*' (when the QTMF code of '*' is predetermined as the specific DTMF code for designating the next information number for example) are notified from the DTMF input timing detector, the information number setting section 3 searches a corresponding information piece in the next information number table of FIG. 3, and finds that the DTMF code '*' is entered by a user during the second piece (having the beginning time of 6.2 sec. and the ending time of 17.5 sec.) of the voice information of the information ion number '100' is under reproduction.

Hence, the information number setting section 3 instructs the voice information control section 2 to stop reproduction of the actual voice information of information number '100' and to begin reproduction of voice information of the information number '150' which is listed as the next information number of the second piece of the information number '100'.

If the DTMF code of the notification data is '#', (and the DTMF code of '#' is predetermined as another specific DTMF code for designating to skip the actual information piece, for example,) instead of the DTMF code '*', the information number setting section 3 instructs the voice information control section 2 to begin reproduction of the next third piece (having the beginning time of 17.6 sec.) of the voice information of the same information number '100', omitting reproduction of the rest of the actual second piece (6.2 sec. to 17.5 sec).

A numeral '—1' listed in the next information number column of the table of FIG. 3 means that there is no alternative information number to be reproduced and hence the actual information piece is to be reproduced continuously.

In the following paragraphs, a concrete example of operation method of the embodiment of FIG. 1 will be described.

When a user makes a call to the voice information service system of FIG. 1, the communication control section 1 takes the call and notifies the voice information control section 2 of the call arrival, The voice information control section 2 controls the voice information storing section 5 to read out an initial voice information (information number '100', for example), mid delivers a reproduction notification comprising the telephone number of the user, the information number '100', and the reference passage time (0 sec., in this case) to the DTMF input timing detector 4. The DTMF input timing detector 4 measures the present time and registers the reproduction notification together with the present, time following the flowchart of FIG. 2A.

The voice information read out from the voice information storing section 5 is converted by the communication control section 1 into a voice signal to be served to the user.

FIG. 4 shows some examples of contents of the voice information prepared in the voice information storing section 5. In FIG. 4, the contents of the voice information are listed in connection with the next information number table of FIG. 3.

In the example of FIG. 4, the following guidance is served to the user as the initial voice information (information number '100'): "Thank you for your calling for our service. Please push your asterisk key when you hear interesting guidance. When you wish to pass uninteresting guidance, please push your sharp key." "As to the product A, push now your asterisk key (followed by a silence)." "As to the product B, push now your asterisk key (followed by a silence)."

When the user, pushes the sharp key, which is assigned to the specific key for passing actual information piece, when he is hearing the second information piece "As to the product A . . . ", the DTMF code of '#' is received by the voice information control section 2 and transferred to the DTMF input timing detector 4 together with the telephone number. Confirming the DTMF code '#', the DTMF input timing detector 4 measures the present time and calculates the effective passage time, 10.2 sec., for example, according to the flowchart of FIG. 2B. The effective passage time is notified to the information number setting section 3 together with the DTMF code '#' and the information number '100' as the notification data.

Receiving the notification data including the DTMF code '#', the information number setting section 3 refers to the next information table of FIG. 3 with the information number '100' and the effective passage time, '10.2 sec.', and finds that the third piece of the information number '100' having a beginning time '17.6 sec.' is to be reproduced next, which is notified to the voice information control section 2.

The voice information control section 2 controls the voice information storing section 5 to read out the third piece having the beginning time '17.6 sec.' of the information number '100', and delivers a reproduction notification including the reference passage time of 17.6 sec., to be registered in the DTMF input timing detector 4 together with the present time. The third information piece of the information number '100', which is read out from the voice information storing section 5, is converted into voice signal by the communication control section 1 to be served to the user.

Thus, the user receives the guidance "As to the product B . . . " after pushing the sharp key.

When the user pushes the asterisk key in the middle of the guidance "As to the product B . . . ", the voice information control section 2 notifies input of the DTMF code '*' to the DTMF input timing detector 4 together with the telephone number of the user.

Receiving the DTMF code notification, the DTMF input timing detector 4 confirms the DTMF code '*' and measures the present time. Obtaining a time difference (2.9 sec., for example,) from the preceding reproduction notification, the DTMF input timing detector 4 calculates the effective passage time by adding the time difference to the registered reference time passage, such as, 17.6+2.9=20.5 sec., in this example. The effective passage time '20.5 sec.' is notified to the information number setting section 3 together with the DTMF code '*' and the information number '100'.

Receiving the notification data including the DTMF code '*', the information setting section 3 refers to the next information table of FIG. 3 with the information number '100' and the effective passage time '20.5 sec.', and obtains the number '151' listed in the next information number column of the third information piece as the information number to be reproduced next, which is notified to the voice information control section 2 together with the reference passage time of 0 sec., indicating reproduction from the head.

The voice information control section 2 delivers a reproduction notification comprising the information number '151', the reference passage time '0 sec.' and the telephone number of the user to the DTMF input timing detector 4, and controls the voice information storing section 5 to read out the voice information of the information number '151' from the beginning of that voice information which is converted into a voice signal by the communication control section 1 to be served to the user.

Thus, the user receives the voice information of the information number '151' (concerning the product B, in this example), after pushing the asterisk key.

As heretofore described in connection with the example of FIGS. 3 and 4, the user can operate the voice information service system of the invention without putting his handset away form his ear even with a cordless telephone, since it can be manipulated by pushing only predetermined specific telephone keys such as the asterisk key and the sharp key

What is claimed is:

1. An operation method of a voice information service system for providing a user with voice information registered therein through a telephone network in accordance with designation of the user; said operation method comprising the steps of:

registering a first time at which the voice information of a first information number begins to be provided to the user together with a telephone number of the user, a value of the first information number, and a reference passage time corresponding to a beginning point in time wherefrom the voice information of the first information number begins to be reproduced;

checking whether a DTMF code which is entered by the user receiving the voice information of the first information number is one of specific DTMF codes or not;

calculating an effective passage time of the voice information of the first information number when the DTMF code entered by the user is found to be one of the specific DTMF codes, by adding a time difference between a second time when the DTMF code is entered and the first time onto the reference passage time, the effective passage time being calculated based on the first time, the telephone number, the value of the first information number and the reference passage time registered for the user; and determining a second information number of the voice information to be reproduced instead of the voice information of the first voice information number together with a beginning point in time wherefrom the voice information of the second information number is to be reproduced for the user, according to the effective passage time, the first information number and a type of said one of the specific DTMF codes entered by the user.

2. A voice information service system as recited in claim 3, farther comprising a next information table that stores information regarding identification values corresponding the first and second information numbers, a time range at which the voice information of the first and second information numbers are to be provided to the user in audible form, with respect to a start time at which the user is first provided with audible data in an introduction section prior to being provided with the voice information of the first information number, and wherein, based on a time at which the user enters one of the specific DTMF codes, the next information table is accessed to determine a next vote information to be provided to the user, and wherein a current voice information is immediately halted so as to provide the next voice information to the user.

* * * * *